(12) United States Patent  (10) Patent No.: US 9,124,575 B2
Friedmann et al.  (45) Date of Patent: Sep. 1, 2015

(54) SELF-SINGLE SIGN-ON

(71) Applicants: Bjoern Friedmann, Rheinmuenster (DE); Martin Kittel, Berlin (DE); Holger Mack, Karlsruhe (DE); Sascha Zorn, Schwetzingen (DE)

(72) Inventors: Bjoern Friedmann, Rheinmuenster (DE); Martin Kittel, Berlin (DE); Holger Mack, Karlsruhe (DE); Sascha Zorn, Schwetzingen (DE)

(73) Assignee: SAP SE, Walldorf (DE)

( * ) Notice: Subject to any disclaimer, the term of this patent is extended or adjusted under 35 U.S.C. 154(b) by 125 days.

(21) Appl. No.: 14/092,283

(22) Filed: Nov. 27, 2013

(65) Prior Publication Data

US 2015/0150111 A1    May 28, 2015

(51) Int. Cl.
*H04L 29/06* (2006.01)
*G06F 21/00* (2013.01)

(52) U.S. Cl.
CPC .................. *H04L 63/0815* (2013.01)

(58) Field of Classification Search
CPC .............................................. H04L 63/0815
See application file for complete search history.

(56) References Cited

U.S. PATENT DOCUMENTS

| | | | |
|---|---|---|---|
| 7,694,140 B1 | 4/2010 | Savchenko et al. | |
| 8,131,755 B2 | 3/2012 | Kadayam et al. | |
| 8,219,974 B2 | 7/2012 | Schmidt | |
| 8,336,089 B1 | 12/2012 | Ahmed et al. | |
| 8,424,058 B2 | 4/2013 | Vinogradov et al. | |
| 8,554,934 B1 | 10/2013 | Delker et al. | |
| 8,578,330 B2 | 11/2013 | Dreiling et al. | |
| 8,590,030 B1 | 11/2013 | Pei | |
| 2003/0163733 A1* | 8/2003 | Barriga-Caceres et al. | .. 713/201 |
| 2005/0240763 A9* | 10/2005 | Bhat et al. | ...... 713/169 |
| 2006/0041933 A1* | 2/2006 | Yakov et al. | ........ 726/8 |
| 2011/0131295 A1 | 6/2011 | Jolfaei | |
| 2012/0266228 A1 | 10/2012 | Dash et al. | |
| 2013/0014243 A1* | 1/2013 | Chen et al. | ........ 726/8 |
| 2013/0086210 A1 | 4/2013 | Yiu et al. | |
| 2013/0144945 A1 | 6/2013 | Said et al. | |
| 2013/0174244 A1 | 7/2013 | Taveau et al. | |
| 2014/0013387 A1 | 1/2014 | Vangpat et al. | |
| 2014/0068702 A1* | 3/2014 | Hyndman et al. | ........ 726/1 |
| 2015/0089617 A1* | 3/2015 | Sondhi et al. | ........ 726/8 |

OTHER PUBLICATIONS

"SAP NetWeaver Single Sign-On Master Guide," SAP NetWeaver Single Sign-On 2.0 SPO Document Version: 1.0, document dated Apr. 8, 2013, 29 pages.

"Single Sign-On in a System Landscape," PDF downloaded from SAP help portal: http://help.sap.com/saphelp_nw70ehp1/helpdata/en/46/55195e4e5d41b095d0371fa9df2781/content.htm, (document not dated, downloaded Nov. 20, 2013), 11 pages.

(Continued)

*Primary Examiner* — Lisa Lewis
(74) *Attorney, Agent, or Firm* — Klarquist Sparkman, LLP

(57) ABSTRACT

Techniques are described for providing sign-on within a trusted environment across multiple application servers. For example, a method can be provided for a single sign-on within a trusted environment across application servers. The method comprises, by a first application operating within the trusted environment, connecting to a first application server via a first access channel, and retrieving an authentication token from the first application server via the first access channel. The method further comprises, by a second application operating within the trusted environment, connecting to a second application server via a second access channel, and authenticating with the second application server with the authentication token.

16 Claims, 10 Drawing Sheets

(56) References Cited

OTHER PUBLICATIONS

"Using OAuth 2.0 to Access Google APIs," downloaded on Nov. 7, 2013, from https://developers.google.com/accounts/docs/OAuth2, last updated Sep. 12, 2013, 5 pages.

"SSO Between Portal, Web Dynpro, and ABAP Systems," PDF downloaded from SAP Help Portal: http://help.sap.com/saphelp_nw70ehp1/helpdata/en/5e/6c85c3edf942f39349a1e337434d29/content.htm, (document not dated, downloaded Nov. 20, 2013), 5 pages.

Wang et al., Signing Me onto Your Accounts through Facebook and Google: A Traffic-Guided Security Study of commercially Deployed Single-Sign-On Web Services, in *IEEE Symposium on Security and Privacy (Oakland), IEE Computer Society*, May 2012, 15 pages.

SAP Hana Security Guide, SAP Hana Platform SPS 06, Document Version: 1.2, document dated Mar. 9, 2013, 83 pages.

\* cited by examiner

SOFTWARE 880 IMPLEMENTING DESCRIBED TECHNOLOGIES

SELF-SINGLE SIGN-ON

BACKGROUND

In today's computing environment, a software service provider may want to provide multiple services to a user. In this environment, the user may need to access multiple application servers. However, the user may be required to sign onto each application server to obtain access to the multiple services. This creates a problem in that it may be tedious for the user to sign onto each of the different application servers. Furthermore, the user may need to manage different usernames and passwords for the different application servers, increasing the challenges of managing the sign on process.

Some solutions have been developed to provide a single sign-on experience. For example, some systems utilize a portal, where access to the multiple application servers is provided by the portal. However, some of the application servers may not be easily configurable to be included in such a solution, or a software system provider may want to decouple some of the application servers from the portal.

Furthermore, a user may need to access the different application servers through different applications, where each application may require a separate sign-on to access the application server. If each user application requires a separate sign-on to each of the application servers, an exponential combination of authentication methods is possible.

Therefore, there exists ample opportunity for improvement in technologies related to signing-on to multiple application servers from multiple user applications.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Techniques and tools are described for providing sign-on within a trusted environment across multiple application servers. For example, an authentication token may be provided to the user after the user successfully signs onto one of the application servers. This authentication token may be used within the trusted environment, by passing the authentication token to the various user applications, allowing any of the applications in the trusted environment to sign onto the multiple application servers.

For example, a method can be provided for a single sign-on within a trusted environment across application servers. The method may include, by a first application operating within the trusted environment, connecting to a first application server via a first access channel, and retrieving an authentication token from the first application server via the first access channel. The method may further include, by a second application operating within the trusted environment, connecting to a second application server via a second access channel, and authenticating with the second application server with the authentication token.

As another example, a computing environment comprising one or more computer servers adapted to provide a single sign-on within a trusted environment across application servers can be provided. The computing environment may comprise a first application server and a second application server. The first application server may be configured to receive sign-on information via a first access channel from a first application, and return an authentication token. The second application server may be configured to receive the authentication token via a second access channel from a second application, and authenticate the second application with the authentication token.

As another example, a computer-readable medium storing computer-executable instructions for providing a single sign-on within a trusted environment across application servers may be provided. The computer-executable instructions may include, by a first application server, connecting to a first application using an authentication method via a first access channel, connecting to a second application via a second access channel, passing an authentication token to the second application via the second access channel, and receiving the authentication token from the second application via the second access channel. The computer-executable instructions may further include, by a second application server, receiving the authentication token from the second application via a third access channel.

As described herein, a variety of other features and advantages can be incorporated into the technologies as desired.

DETAILED DESCRIPTION

Overview

Figure 1:
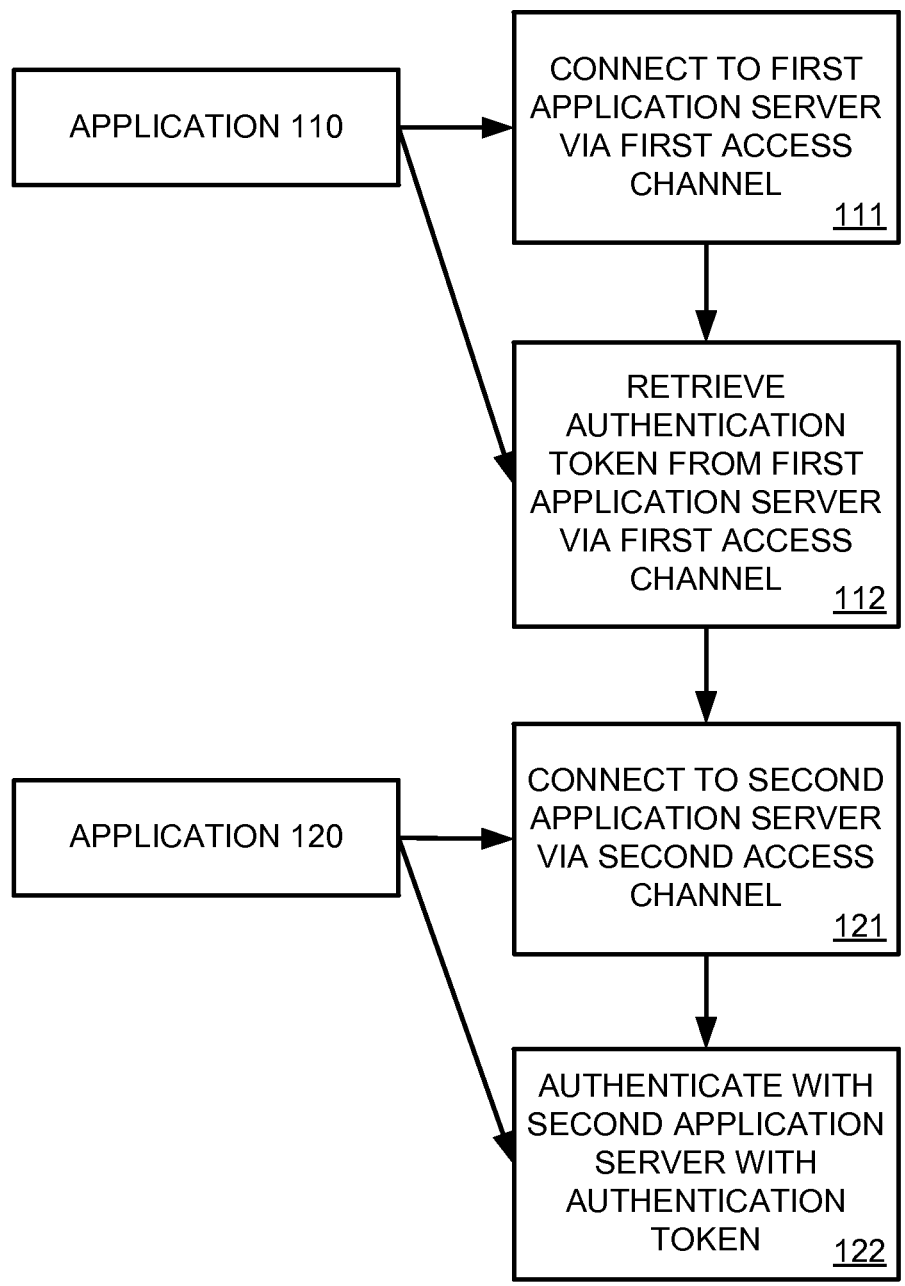
FIG. 1 is a flowchart of an example method for providing a single sign-on within a trusted environment across application servers.

As described herein, various techniques and solutions can be applied for providing a single sign-on within a trusted environment across multiple application servers. For example, an authentication token may be provided to the user after the user successfully signs-on to one of the application servers. This authentication token may be used within the trusted environment, by passing the authentication token to the user applications, allowing any of the applications in the trusted environment to sign onto the multiple application servers.

In the following descriptions, the term "application server" is used. However, an application server is not limited to a single server device and may span multiple server devices. For example, the application server may be hosted in a cloud computing environment and be distributed in the cloud. Furthermore, multiple application servers may exist on a single computing platform. For example, a computing platform may include a web server and a database server.

Self-Single Sign-on

In the technologies described herein, a user may sign-on to one of the application servers. For example, a user may provide a username and password to authenticate the user on an application server. However, signing onto the application server is not limited to a username and password authentication. For example, the user may use an external user repository, such as Kerberos or Security Assertion Markup Language (SAML). The user may also sign-on using a X.509 client certificate or a logon ticket. Any means to authenticate the user on the different application servers may be used.

Furthermore, signing-on is not limited to, e.g., a designated sign-on server. Any application server that can authenticate the user and return an authentication token can be used for the self-single sign-on.

In the following descriptions, the terms "sign-on," "single sign-on" and "self-single sign-on" may be used interchangeably. The computing platform generates the authentication token, which it later consumes itself. The same application server that sends the authentication token need not necessarily consume the authentication token. Any of the application servers on the computing platform may consume the authentication token. In addition, the authentication token may be generated by the application server (on which the user signs-on), or may be generated by another server on the computing platform. Thus, instead of relying on an independent service to provide the authentication token, the computing platform itself generates the authentication token.

Authentication Token

In the technologies described herein, an authentication token may be provided. For example, after a user signs onto an application server, the server authenticates the user and provides an authentication token. The authentication token may comprise information on the user and information on the system. For example, the authentication token may comprise a user name and a certification of the issuing system of the application server. The authentication token may also include a timestamp, indicating when the token was created, and/or a validity period, e.g., indicating when the token expires. The validity period may be set by the application server or set to a default value, e.g., two minutes. The authentication token may be also be encrypted or signed.

The authentication token may be used by any of the applications in the trusted environment. The trusted environment may include only those applications that are provided by the service provider to the user, applications deemed by the user and/or service provider to be trusted, or any application contained within the user's secured environment. A user's secured environment may include the user's mobile phone or private personal computer (PC). The trusted environment may also include those application servers to which the user has access. For example, if the user only has access to a single application server, the user would need to sign onto the other application servers in order to be granted access.

Furthermore, the trusted environment is not limited to a single device and may be spread through multiple devices. For example, a trusted environment may include those applications on a user's PC and mobile device. Each device in the trusted environment may have one or more applications that access the application servers.

Each application may receive the authentication token, allowing the application to access the application servers. The authentication token may be retrieved from the application server to which the user signed on, or from one of the applications in the trusted environment. However, means for retrieving the authentication token is not limited to the foregoing, and may be passed by other means. For example, a token may be passed through a shared portion of memory. The authentication may also be shared between devices by, e.g., a Bluetooth connection.

Access Channel

In the technologies described herein, an access channel is used for communication between an application and application server. An access channel may be any communication protocol used between the application and application server. For example, the access channel may be a web server protocol, e.g., HTTP. The application may communicate with the application server by sending a HTTP request to the application server. An access channel may also be an Open Database Connectivity (ODBC) application programming interface (API) or Java Database Connectivity (JDBC) API connection. For example, the application may make an ODBC or JDBC call to an application server (database).

An access channel also describes the starting point and endpoint of the communication. For example, an application 1 may communicate with an application server 1 through an access channel. An application 2 may also communicate with the application server 1 through a different access channel. Each application may communicate with application server 1 through, e.g., HTTP, but each uses a different access channel.

Method for Providing Single Sign-on (Application)

FIG. 1 is a flowchart of an example method for providing a single sign-on within a trusted environment across application servers.

At 111, an application 110 connects to a first application server via a first access channel. For example, the application 110 may be a web browser and the first application server may comprise a web server. The application 110 may connect to the first application server using a username and password. The application 110 may connect to the first application server using a web server protocol, e.g., HTTP.

At 112, the application 110 retrieves an authentication token from the first application server via the first access channel. In this example, the application 110 retrieves the authentication via the first channel. However, the application 110 may also retrieve the authentication token via a different channel. Also, the application 110 retrieves the authentication from the first application server. However, the application 110 may also retrieve the authentication token from a different application server, e.g., the application server may direct another application server to send the authentication token to the application 110.

At 121, an application 120 (a different application from application 110) connects to a second application server via a second access channel. For example, the application 120 may be a spreadsheet program and the second application server may comprise a database. The application 120 may connect to the second application server using an ODBC or JDBC API (e.g., using a network protocol such as the Tabular Data Stream (TDS) protocol).

At 122, the application 120 authenticates with the second application server with the authentication token. In this example, the application 110 passes the authentication token from the application 120 via a third access channel. However, the application 120 may instead retrieve the authentication token from the first application server. Alternatively, the application may receive the authentication token from any other the other applications in the trusted environment.

In this example, the application 120 connects to a second application server via the second access channel. The application 120 may also connect to the first application server via, e.g., a third channel. Furthermore, the application 110 may connect to the second application server via, e.g., a fourth channel.

In this example, the first access channel and the second access channel use different network protocols. However, the first access channel and second access channel may use the same network protocol. Any network protocol allowed by the different application servers may be used.

Method for Providing Single Sign-on (Application Server)

Figure 2:
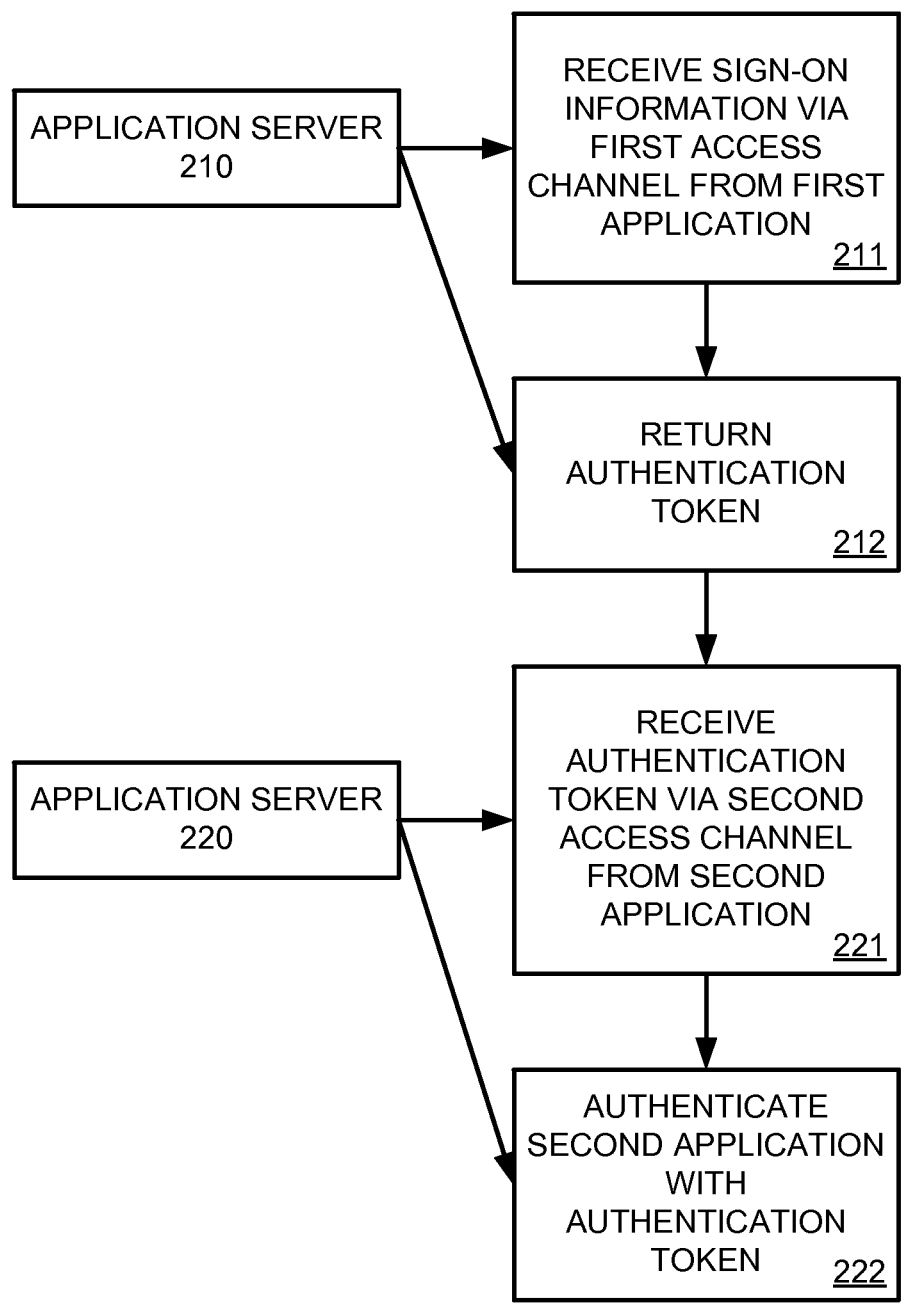
FIG. 2 is a flowchart of an example method for providing a single sign-on within a trusted environment across application servers.

FIG. 2 is another flowchart of an example method for providing a single sign-on within a trusted environment across application servers.

At 211, an application server 210 receives sign-on information via a first channel from a first application. For example, the application server 210 may comprise a web server and receive the sign-on information from the first application using a web server protocol, e.g., HTTP.

At 212, the application server 210 returns an authentication token. The sign-on information may be used to create the authentication token. The authentication token may be returned to the first application via the first access channel, whereby the authentication token is passed from the first application to a second application. Alternatively, the authentication token may be returned to the second application via a different channel.

At 221, an application server 220 receives the authentication token via a second access channel from a second application. For example, the application server 220 may be a database server and connect to the second application using an ODBC or JDBC API.

At 222, the application server 220 authenticates the second application with the authentication token. The user need not provide a username and password to the application server 220, since the application server will use the authentication token to authenticate the second application.

In this example, the application server 220 authenticates the second application with the authentication token. The application server 210 may also authenticate the second application with the authentication token. In addition, the application server 210 may communicate with the second application using a different channel than the first and second channels.

Method for Providing Single Sign-on (Application Server)

Figure 3:
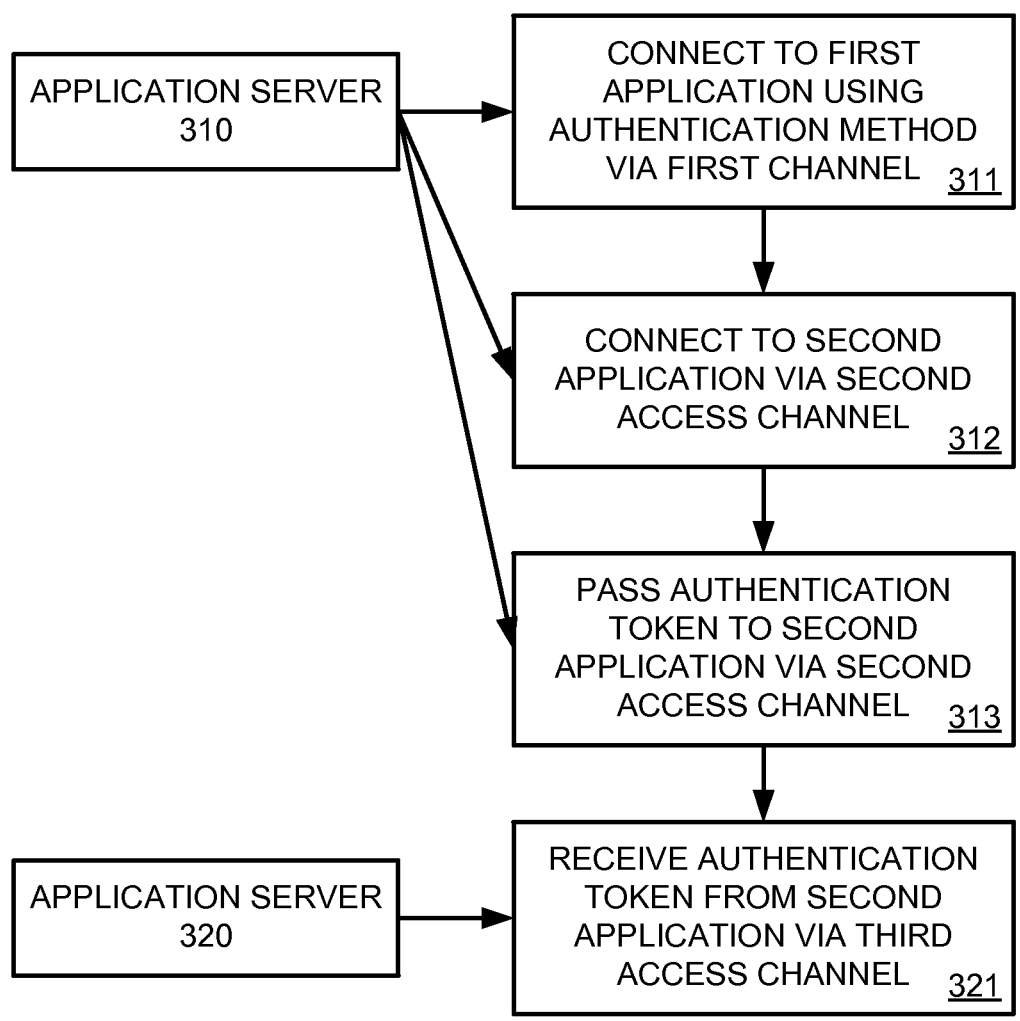
FIG. 3 is a flowchart of an example method for providing a single sign-on within a trusted environment across application servers.

FIG. 3 is another flowchart of an example method for providing a single sign-on within a trusted environment across application servers.

At 311, an application server 310 receives sign-on information via a first channel from a first application.

At 312, the application server 310 connects to a second application via a second access channel.

At 313, the application server 310 passes an authorization token to the second application via the second access channel.

At 314, the application server 310 receives the authorization token from the second application via the second access channel. The application server 310 may also receive the authorization token from the second application via a different channel.

At 321, an application server 320 receives the authorization token from the second application via a third access channel.

In this example, the second application does not need to directly communication with the first application. The first application signs onto an application server, and the application server provides access for the second application to all of the application servers.

Furthermore, the application server 310 may also pass the authorization token to the first application via the first access channel. This allows the first application to also sign onto other application servers. For example, the application server 320 may receive the authorization token from the first application via a fourth access channel. Thus, application servers 310 and 320 may grant access to both the first and second application through a single sign-on.

The application server 310 need not authenticate the second application when it receives the authentication token at 314. Instead, for example, the application server 310 may authenticate the second application when it passes the authorization token at 313. Furthermore, the second application need not send the authentication token to the application server 310 at 314. Instead, via the connection at 312 and 313, the second application may be authenticated with the application server 310.

Single Sign-on

Figure 4:
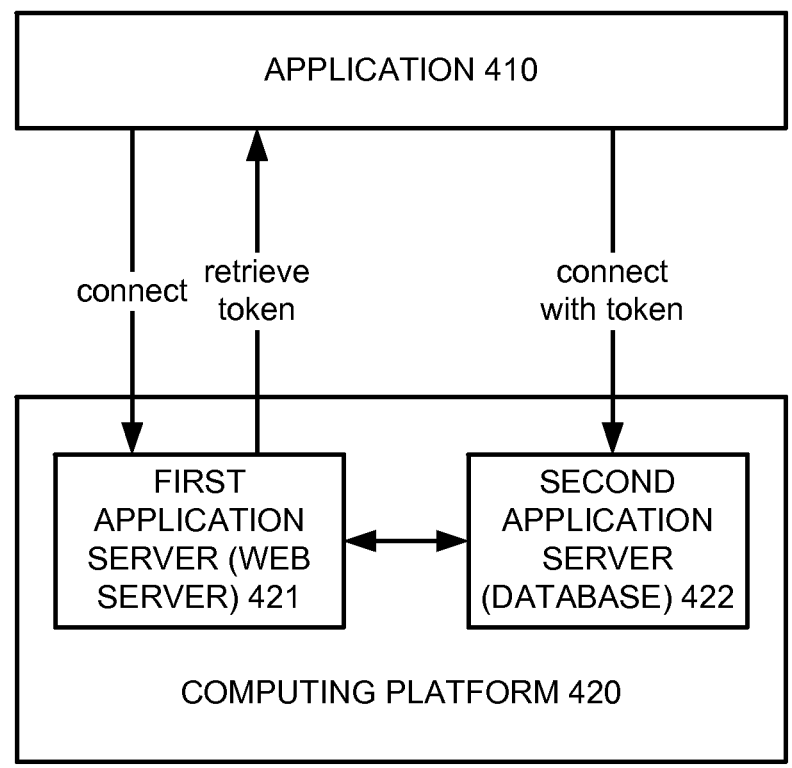
FIG. 4 is a diagram of a single sign-on method using a single application.

FIG. 4 is an example block diagram depicting a single sign-on within a trusted environment across application servers. In this example diagram, the trusted environment comprises the application 410 and the computing platform 420. An application 410 connects to a first application server (web server) 421. The application 410 signs on to the first application server 421 using any of the authentication methods previously described.

After the first application server 421 authenticates the user, the first application server 421 sends an authentication token to the application 410. The application 410 retrieves the authentication token from the first application server 421.

The application 410 then connects to a second application server (database) 422 with the authentication token.

The first application server 421 and second application server 422 are on a single computing platform 420. Although not depicted, the first application server 421 and the second application server 422 may communicate with each other. For example, the first application server 421 may access the second application server 422 directly by making database commands to the second application server 422 or running a script. Alternatively, the first application server 421 and the second application server 422 can be on different computing platforms, but still within the trusted environment.

In FIG. 4, the communications between the application 410 and the first application server 421 occur via a first access channel via a particular network protocol (e.g., via HTTP). The communications between the application 410 and the second application server 422 occur via a second access channel via a particular network protocol, which could be a different network protocol (e.g., the TDS protocol) or the same network protocol as the first access channel (HTTP).

In some implementations, a particular access channel can communicate indirectly with a database (e.g., the first access channel between the application 410 and the first application server 421, where the first application server 421 is a web server that then communicates with a database, which could be the second application server 422), while a different access channel can communicate directly with a database (e.g., the second access channel between the application 410 and the second application server 422, where the second application server 422 is a database that is being directly accessed via the ODBC or JDBC API for example).

Furthermore, the first application server and the second application server may communicate between each other. For example, the first application server (web server) 421 may connect directly to the second application server (database) 422. In this example, the first application server 421 and the second application server 422 do not need to authenticate with each other. However, the first application server 421 and the second application server 422 may also require receiving the authentication token by a different channel.

Figure 5:
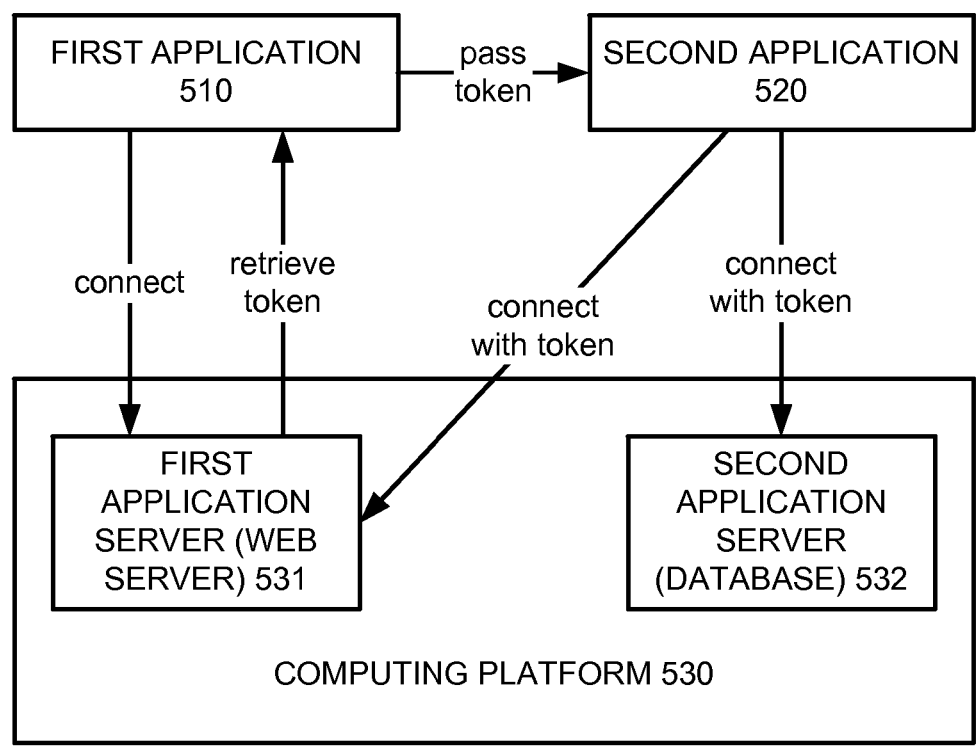
FIG. 5 is a diagram of a single sign-on method using a multiple applications.

FIG. 5 is another example block diagram depicting a single sign-on within a trusted environment across application servers. FIG. 5 depicts a case where there are multiple applications accessing the computing platform 530. A first application 510 connects to a first application server (web server) 531. The first application 510 signs on using any of the authentication methods previously described.

After the first application server 531 authenticates the user, the first application server 531 sends an authentication token to the first application 510. The first application 510 retrieves the authentication token from the first application server 531.

The first application 510 then passes the authentication token to a second application 520. The second application 520 may be on the same device as the first application 510 or on a different device.

The second application 520 connects to the first application server 531 and/or a second application server (database) 532 with the authentication token.

In FIG. 5, the communications between the first application 510 and the first application server 531 occur via a first access channel via a particular network protocol (e.g., via HTTP). The communications between the second application 520 and the first application server 531 occur via a second access channel via a particular network protocol, which could be a different network protocol (e.g., the TDS protocol) or the same network protocol as the first access channel (HTTP). The communications between the second application 520 and the second application server 531 occur via a third access channel via a particular network protocol, which could also be a different network protocol (e.g., the TDS protocol) or the same network protocol as the first access channel (HTTP).

Figure 6:
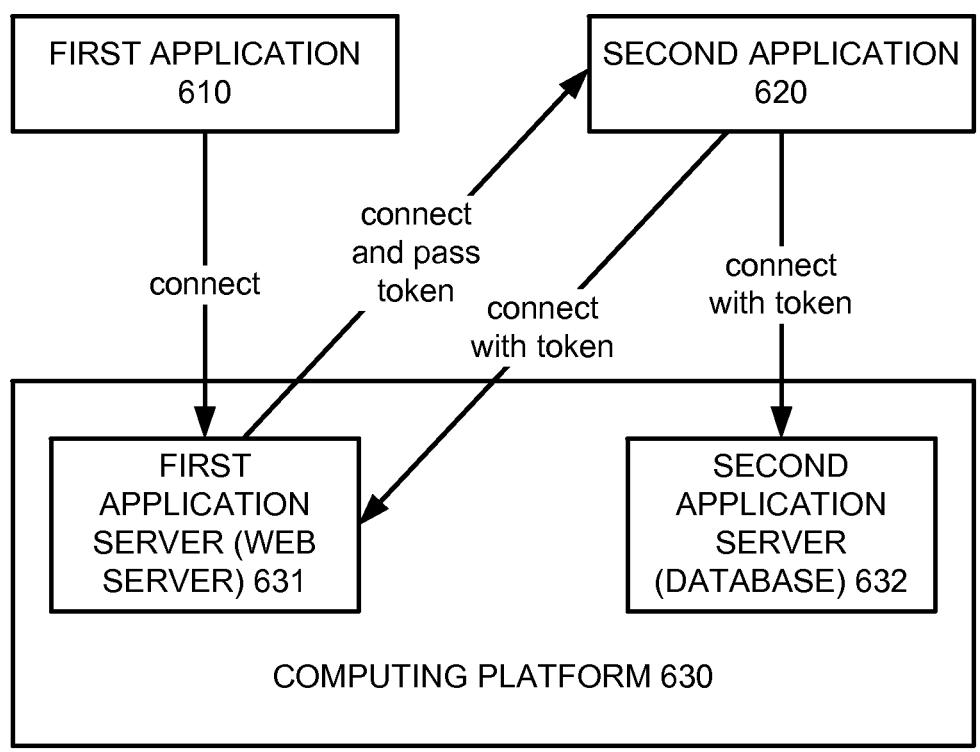
FIG. 6 is a diagram of a single sign-on method using a multiple applications.

FIG. 6 is another example block diagram depicting a single sign-on within a trusted environment across application servers. A first application 610 connects to a first application server (web server) 631. The first application 610 signs-on using any of the authentication methods previously described.

After the first application server 631 authenticates the user, the first application server 631 connects to a second application 620 and passes an authentication token to a second application 620.

The second application 620 then connects to the first application server 631 and/or a second application server (database) 632 with the authentication token.

In FIG. 6, the communications between the first application 610 and the first application server 631 occur via a first access channel via a particular network protocol (e.g., via HTTP). The communications between the second application 620 and the first application server 631 occur via a second access channel via a particular network protocol, which could be a different network protocol (e.g., the TDS protocol) or the same network protocol as the first access channel (HTTP). The communications between the second application 620 and the second application server 632 occur via a third access channel via a particular network protocol, which could also be a different network protocol (e.g., the TDS protocol) or the same network protocol as the first access channel (HTTP).

Figure 7:
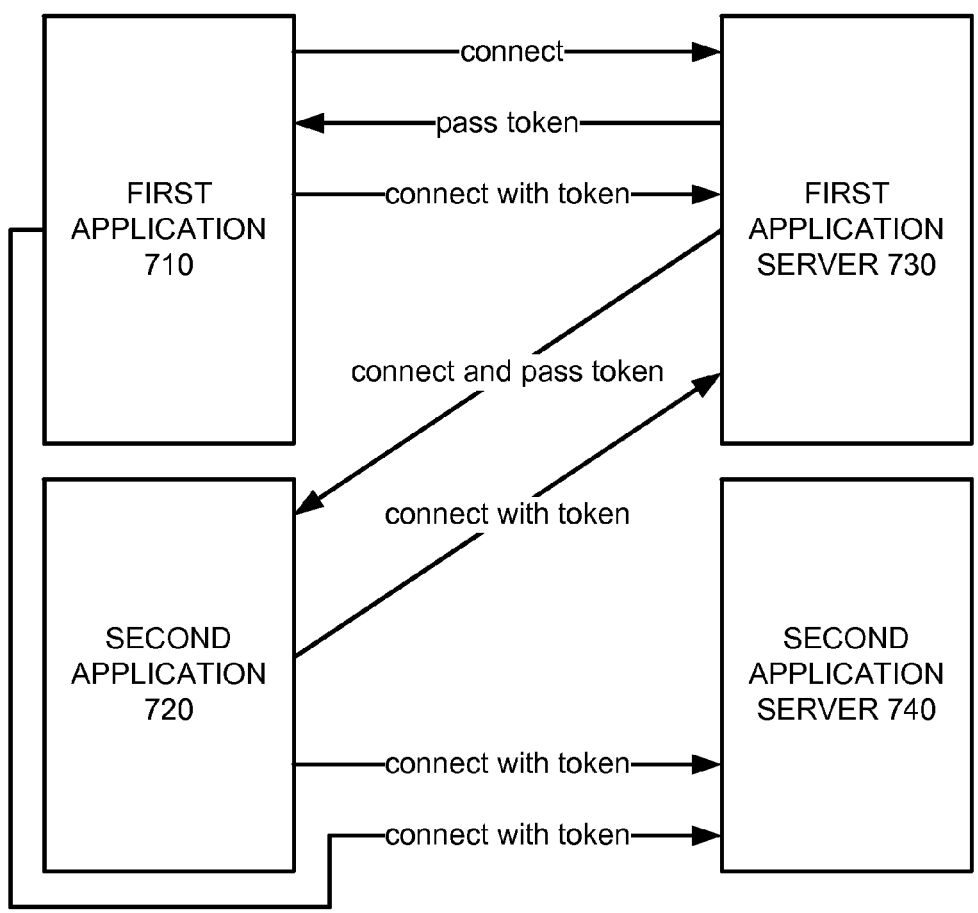
FIG. 7 is a diagram of a single sign-on method using a multiple applications.

FIG. 7 is another example block diagram depicting a single sign-on within a trusted environment across application servers. A first application 710 connects to a first application server 730. The first application 710 signs-on to the first application server 730 using any of the authentication methods previously described.

After the first application server 730 authenticates the user, the first application server 730 connects to a second application 720 and passes an authentication token to the second application 720. The first application server also passes the authentication token back to the first application 710.

The first application 710 and second application 720 may then connect to the first application server 730 with the authentication token. The first application 710 and second application 720 may also connect to a second application server 740 with the authentication token. Thus, the first application 710 and second application 720 have access to the first application server 730 and second application server 740 through a single sign on.

In FIG. 7, the communications between the first application 710 and the first application server 730 occur via a first access channel via a particular network protocol (e.g., via HTTP). The communications between the first application 710 and the second application server 740 occur via a second access channel via a particular network protocol, which could be a different network protocol (e.g., the TDS protocol) or the same network protocol as the first access channel (HTTP). The communications between the second application 720 and the first application server 730 occur via a third access channel via a particular network protocol, which could also be a different network protocol (e.g., the TDS protocol) or the same network protocol as the first access channel (HTTP). The communications between the second application 720 and the second application server 740 occur via a fourth access channel via a particular network protocol, which could also be a different network protocol (e.g., the TDS protocol) or the same network protocol as the first access channel (HTTP). In this example, each application connects to each application server via a different channel using the same or different network protocol.

Additional applications and application servers can be added while still only using a single sign on. For example, if a third application is added, the third application could receive the authentication token, either from one of the other applications or one of the application servers, allowing the third application to have access to any of the application servers.

Furthermore, if a third application server is added, the third application server need only receive the authentication token to allow access to an application attempting to connect to the server.

In other implementations, other techniques can be employed to provide a single sign-on within a trusted environment across application servers.

Computing Systems

Figure 8:
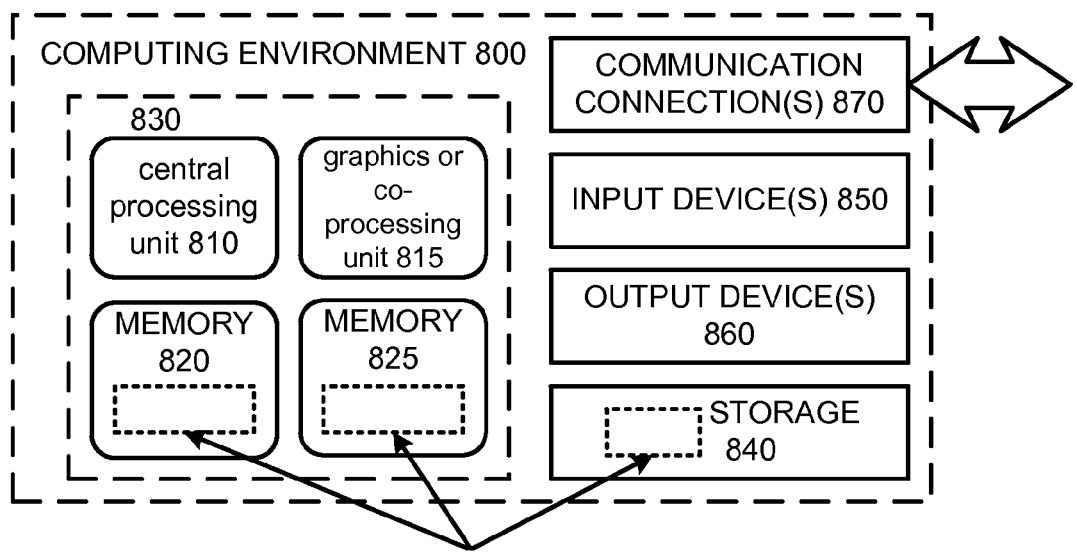
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 9:
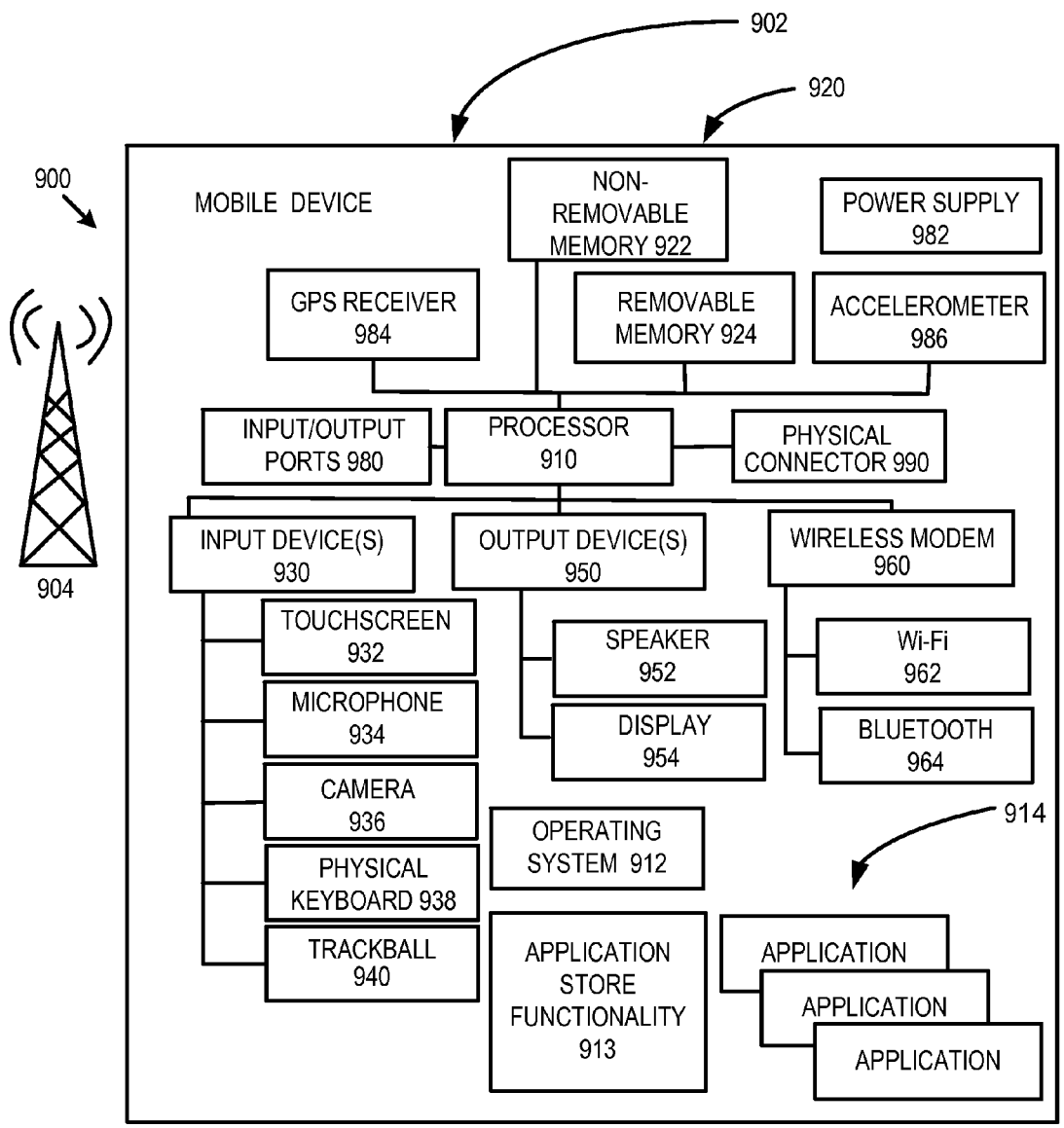
FIG. 9 is an example mobile device that can be used in conjunction with the technologies described herein.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Cloud-Supported Environment

Figure 10:
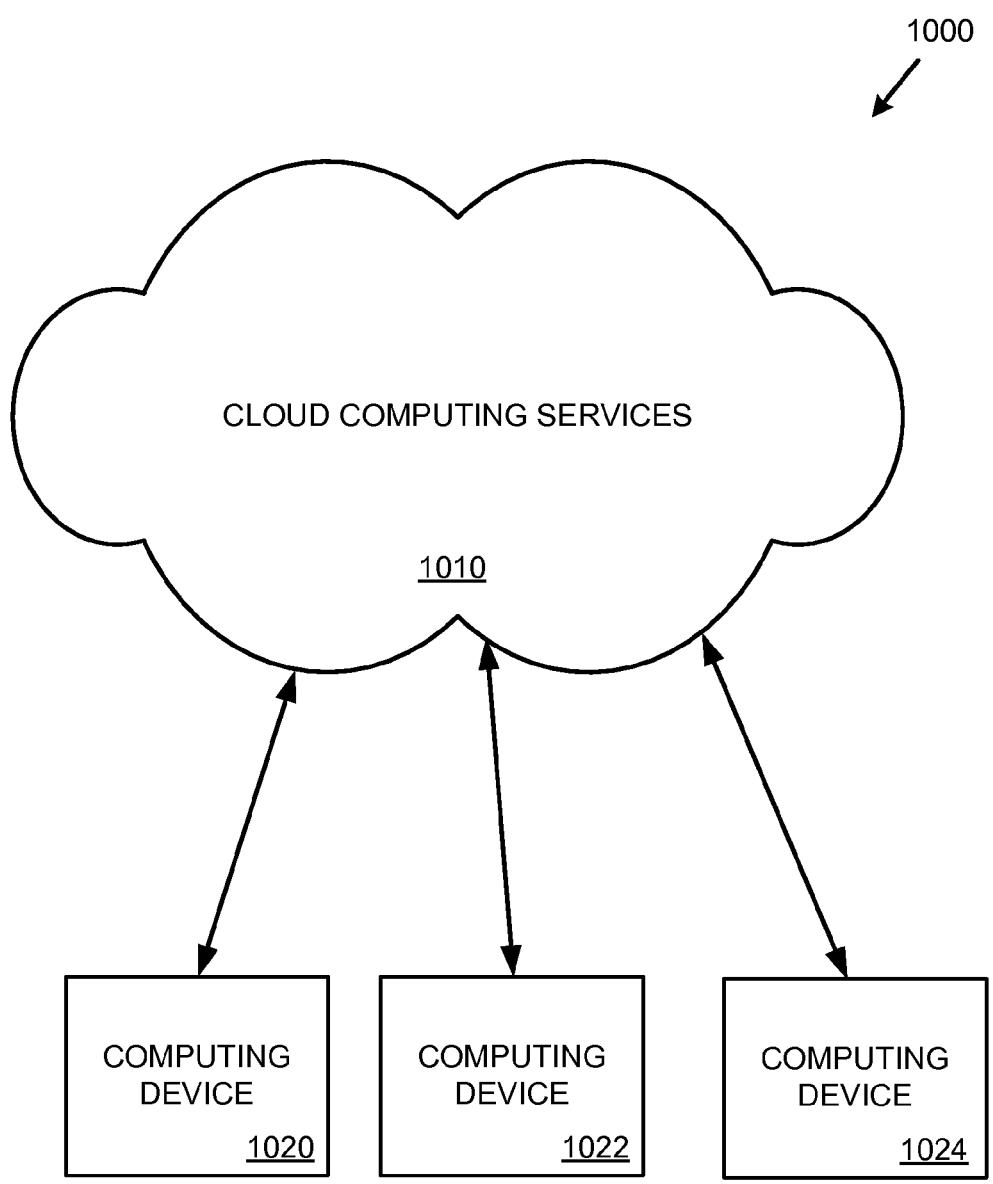
FIG. 10 is an example cloud-support environment that can be used in conjunction with the technologies described herein.

FIG. 10 illustrates a generalized example of a suitable cloud-supported environment 1000 in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1020, 1022, 1024) while other tasks (e.g., storage of data to be used in subsequent processing) can be performed in the cloud 1010.

One or more of the connected devices 1020, 1022, 1024 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers or through other providers of online services (not depicted). For example, cloud services can be customized to the screen size, display capability, and/or touchscreen capability of a particular connected device (e.g., connected devices 1020, 1022, 1024).

In example environment 1000, the cloud 1010 provides the technologies and solutions described herein to the various connected devices 1020, 1022, 1024 using, at least in part, service providers. For example, the service providers can provide a centralized solution for various cloud-based services. The service providers can manage service subscriptions for users and/or devices (e.g., for the connected devices 1020, 1022, 1024 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. By way of example and with reference to FIG. 9, computer-readable storage media include memory and storage 920, 922, and 924. The term computer-readable storage media does not include signals and carrier waves. In addition, the term computer-readable storage media does not include communication connections (e.g., 870, 960, 962, and 964).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the invention is defined by the following claims. We therefore claim as our invention all that comes within the scope and spirit of these claims.

We claim:

1. A method of providing a single sign-on within a trusted environment across application servers comprising:
   by a first application operating within the trusted environment;
      connecting to a first application server via a first access channel;
      retrieving an authentication token from the first application server via the first access channel;
      connecting to a second application server via a fourth access channel; and
      authenticating with the second application server with the authentication token; and
   by a second application operating within the trusted environment:
      receiving the authentication token from the first application server via a third access channel;
      connecting to the second application server via a second access channel; and
      authenticating with the second application server with the authentication token.

2. The method of claim 1, wherein connecting to the first application server comprises authenticating a user with the first application server using, at least in part, a username and password.

3. The method of claim 1, wherein the authentication token comprises a user name and a certificate of an issuing system of the first application server.

4. The method of claim 1, wherein the authentication token includes a validity period.

5. The method of claim 1, wherein the first access channel and the second access channel use different network protocols.

6. The method of claim 1, wherein the first application server comprises a web server, and wherein the first access channel comprises a network connection between the first application and the web server using a web server protocol.

7. The method of claim 1, wherein the second application server comprises a database server, and wherein the second access channel comprises a network connection between the second application and the database server that communicates using at least one of an Open Database Connectivity (ODBC) application programming interface (API) and a Java Database Connectivity (JDBC) API.

8. The method of claim 1, further comprising passing the authentication token from the first application to the second application via a fifth access channel between the first application and the second application.

9. A computing environment comprising one or more computer servers adapted to provide a single sign-on within a trusted environment across application servers, comprising:
   a first application server operating within the trusted environment, the first application server configured to perform operations comprising:
      receiving sign-on information via a first access channel from a first application; and
      returning an authentication token to the first application via the first access channel;
      connecting to a second application via a third access channel; and
      returning the authentication token to the second application via the third access channel; and
   a second application server operating within the trusted environment, the second application server configured to perform operations comprising:
      receiving the authentication token via a second access channel from the second application;
      authenticating the second application with the authentication token; and
      receiving the authentication token from the first application via a fourth access channel.

10. The computing device of claim 9, wherein the sign-on information is used to create the authentication token.

11. The computing device of claim 9, wherein the authentication token comprises a user name and a certificate of an issuing system of the first application server.

12. The computing device of claim 9, wherein the first application server and the second application server are on a computing platform, and the computing platform generates the authentication token.

13. The computing device of claim 9, wherein the first application server comprises a web server, and wherein the first access channel comprises a network connection between the first application and the web server using a web server protocol.

14. The computing device of claim 9, wherein the second application server is a database server, and wherein the second access channel comprises a network connection between the second application and the database server that communicates using at least one of an Open Database Connectivity (ODBC) application programming interface (API) and a Java Database Connectivity (JDBC) API.

15. The computing device of claim 9, wherein the first application is on one device and the second application is on a different device.

16. A non-transitory computer-readable medium storing computer-executable instructions for providing a single sign-on within a trusted environment across application servers comprising:

by a first application server operating within the trusted environment:
　connecting to a first application using an authentication method via a first access channel;
　connecting to a second application via a second access channel;
　passing an authentication token to the second application via the second access channel; and
　passing the authentication token to the first application via the first access channel; and by a second application server operating within the trusted environment:
　receiving the authentication token from the second application via a third access channel; and
　receiving the authentication token from the first application via a fourth access channel.

* * * * *